United States Patent [19]
Rohatgi et al.

[11] Patent Number: 5,625,693
[45] Date of Patent: Apr. 29, 1997

[54] APPARATUS AND METHOD FOR AUTHENTICATING TRANSMITTING APPLICATIONS IN AN INTERACTIVE TV SYSTEM

[75] Inventors: Pankaj Rohatgi, Sunnyvale; Vincent Dureau, Vemas, both of Calif.

[73] Assignee: Thomson Consumer Electronics, Inc., Indianapolis, Ind.

[21] Appl. No.: 499,280

[22] Filed: Jul. 7, 1995

[51] Int. Cl.$^6$ ...................................................... H04L 9/32
[52] U.S. Cl. ........................................... 380/23; 380/25
[58] Field of Search .................................. 380/25, 23, 49

[56] References Cited

U.S. PATENT DOCUMENTS

| | | | |
|---|---|---|---|
| 3,996,449 | 12/1976 | Attanasio | 340/149 |
| 4,567,600 | 1/1986 | Massey et al. | 375/2.1 |
| 4,658,093 | 4/1987 | Hellman | 380/25 |
| 4,853,961 | 8/1989 | Pastor | 380/25 |
| 4,935,962 | 6/1990 | Austin | 380/25 |
| 4,995,082 | 2/1991 | Schnorr | 380/25 |
| 5,005,200 | 4/1991 | Fischer | 380/25 |
| 5,032,987 | 7/1991 | Broder et al. | 364/200 |
| 5,136,642 | 8/1992 | Kawamura et al. | 380/21 |
| 5,140,634 | 8/1992 | Guillou et al. | 380/23 |
| 5,231,668 | 7/1993 | Kravitz | 380/28 |
| 5,349,642 | 9/1994 | Kingdon | 380/25 |
| 5,351,294 | 9/1994 | Matsumoto et al. | 380/23 |
| 5,369,702 | 11/1994 | Shanton | 380/4 |
| 5,369,707 | 11/1994 | Follendore, III | 380/25 |
| 5,392,353 | 2/1995 | Morales | 380/20 |
| 5,392,355 | 2/1995 | Khurana et al. | 380/23 |
| 5,420,866 | 5/1995 | Wasilewski | 370/110.1 |

FOREIGN PATENT DOCUMENTS

| | | | |
|---|---|---|---|
| WO92/14318 | 8/1992 | WIPO | H04L 9/32 |
| 95/15655 | 6/1995 | WIPO | H04N 7/16 |

*Primary Examiner*—Thomas H. Tarcza
*Assistant Examiner*—Carmen D. White
*Attorney, Agent, or Firm*—Joseph S. Tripoli; Eric P. Herrmann; Ronald H. Kurdyla

[57] ABSTRACT

An executable interactive program is combined with audio/video data for transmission. The program is divided into modules, similar to computer files, and a Directory Module is created which links program modules. Security for the executable application is provided by attaching a signed certificate to respective Directory Modules. The integrity of respective modules is monitored by hashing respective modules and including respective hash values in the Directory Module. A hash value of the Directory Module containing the other hash values is generated, encrypted and attached to the Directory Module. At a receiver the certificate is decoded and checked for authenticity of provider. If the certificate is authentic the program may be executed but only if receiver generated hash values of respective program modules are identical to corresponding hash values contained in the Directory Module.

23 Claims, 8 Drawing Sheets

TABLE I

| BITS | FUNCTION |
|---|---|
| 16 | MODULE ID |
| 32 | TOTAL BYTES IN MODULE INCLUDING CRC |
| 32 | MODULE VERSION NUMBER |
| 32 | MODULE TRANSMISSION UNIT BYTE OFFSET |
| 32 | LENGTH (BYTES) OF TRANSMISSION UNIT |
| XX | RESERVED |

FIG. 6   TABLE II

| BITS | FUNCTION |
|---|---|
| 32 | APPLICATION IDENTIFIER (AID) |
| YY | APPLICATION TYPE |
| ZZ | APPLICATION QUALIFIERS |
| 32 | DECODER MEMORY REQUIREMENTS FOR APPLICATION |
| 16 | TOTAL MODULE COUNT |
| XX | FIRST SECURITY INFORMATION |
| | *for each module* |
| 16 | POINTER TO MODULE STRING TABLE |
| 16 | MODULE IDENTIFIER |
| 32 | MODULE VERSION NUMBER |
| 32 | LENGTH OF MODULE INCLUDING CRC |
| 32 | DECODER MEMORY REQUIREMENTS (IF CODE MODULE) |
| 32 | OTHER FLAGS |
| XX | STRING TABLE FOR MODULE NAMES, STRINGS ARE NULL TERMINATED |
| NN | FURTHER SECURITY INFORMATION |
| *SIGNED CERTIFICATE* | |
| *HASH* | |

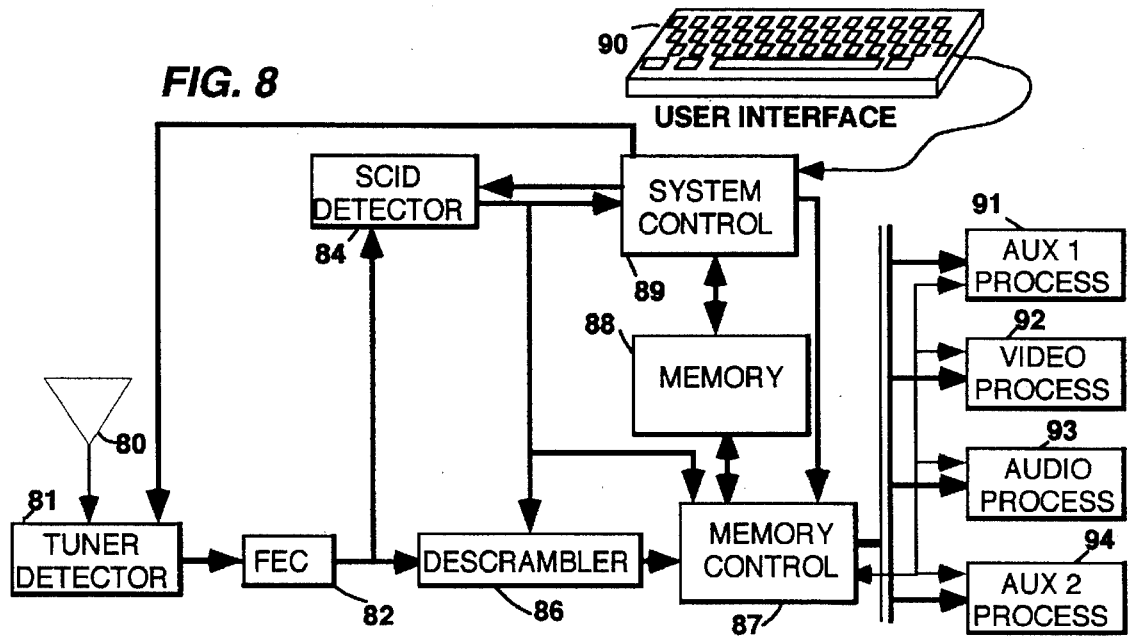

FIG. 8

APPARATUS AND METHOD FOR AUTHENTICATING TRANSMITTING APPLICATIONS IN AN INTERACTIVE TV SYSTEM

This invention relates to a method and apparatus for insuring that data accepted by an interactive television system is authorized data.

BACKGROUND OF THE INVENTION

Interactive television (TV) systems are known from for example U.S. Pat. No. 5,233,654. Interactive television systems typically involve the transmission of programming and/or control data (hereafter PC-data), as well as audio and video information, to respective receiving apparatus. The receiving apparatus decodes the PC-data, and applies it to some type of control apparatus for automatic use by the receiver or selective use by the user of the receiver. The control apparatus may take the form of a computer, for example, and the use may include downloading selective e.g., financial data for subsequent user manipulation.

As envisioned herein, information in the interactive television system (ITVS) is transmitted in compressed digital form. The receiving end of the system includes an integrated receiver decoder (IRD) for receiving and decompressing the transmitted information and providing decoded audio, video and PC-data to respective processors. The audio and video processors may be audio and video reproduction devices or a television receiver and the PC-data processor may be a computer. Ideally the system will only provide well tested PC-data provided by authorized service providers, and under such conditions there is little likelihood of transmitted information actually damaging respective receivers. However, if a large number of service providers are authorized to use the system, it becomes vulnerable to a) invasion by unauthorized users and intentional infliction of damage to system users, and b) careless preparation of PC-data and consequent unintentional damage to system users. The ability to broadcast PC-data to tens of thousands of IRD's simultaneously, multiplies the potential disruption that may be inflicted by ill behaved software many fold. Thus there is a need for measures to assure protection of respective ITVS receivers from both ill behaved and unauthorized PC-data.

SUMMARY OF THE INVENTION

A receiver embodiment of the invention includes an IRD which is responsive to a transmitted program guide for selecting signal packets of PC-data. The IRD temporarily stores the selected PC-data. Authorized PC-data will include a certificate. A PC-data processor is configured to separate the certificate and to check it for authenticity. The processor hashes portions of the PC-data and compares the generated hash values with hash values transmitted with the PC-data and corresponding to the same portions of PC-data. If the hash values are identical and the certificate is authentic, the system is conditioned to execute the transmitted program.

A transmitter embodiment includes software generating apparatus for providing an interactive program. The program is divided into modules and a Directory Module is generated. Respective modules are hashed and the generated module hash values are included in the Directory Module. The modules are then conditioned for transmission.

The invention will be described with the aid of the following drawings.

BRIEF DESCRIPTION OF THE DRAWINGS

FIG. 6 is a table of the contents of an exemplary Directory Module of a AVI application embodying the invention.

FIG. 8 is a block diagram of exemplary receiver apparatus embodying the invention.

DETAILED DESCRIPTION

The invention will be described in the environment of a compressed digital transmission system, as for example a direct broadcast satellite system. It is presumed that a single satellite transponder will accommodate a plurality of respective TV programs in time division multiplexed format.

Figure 1:
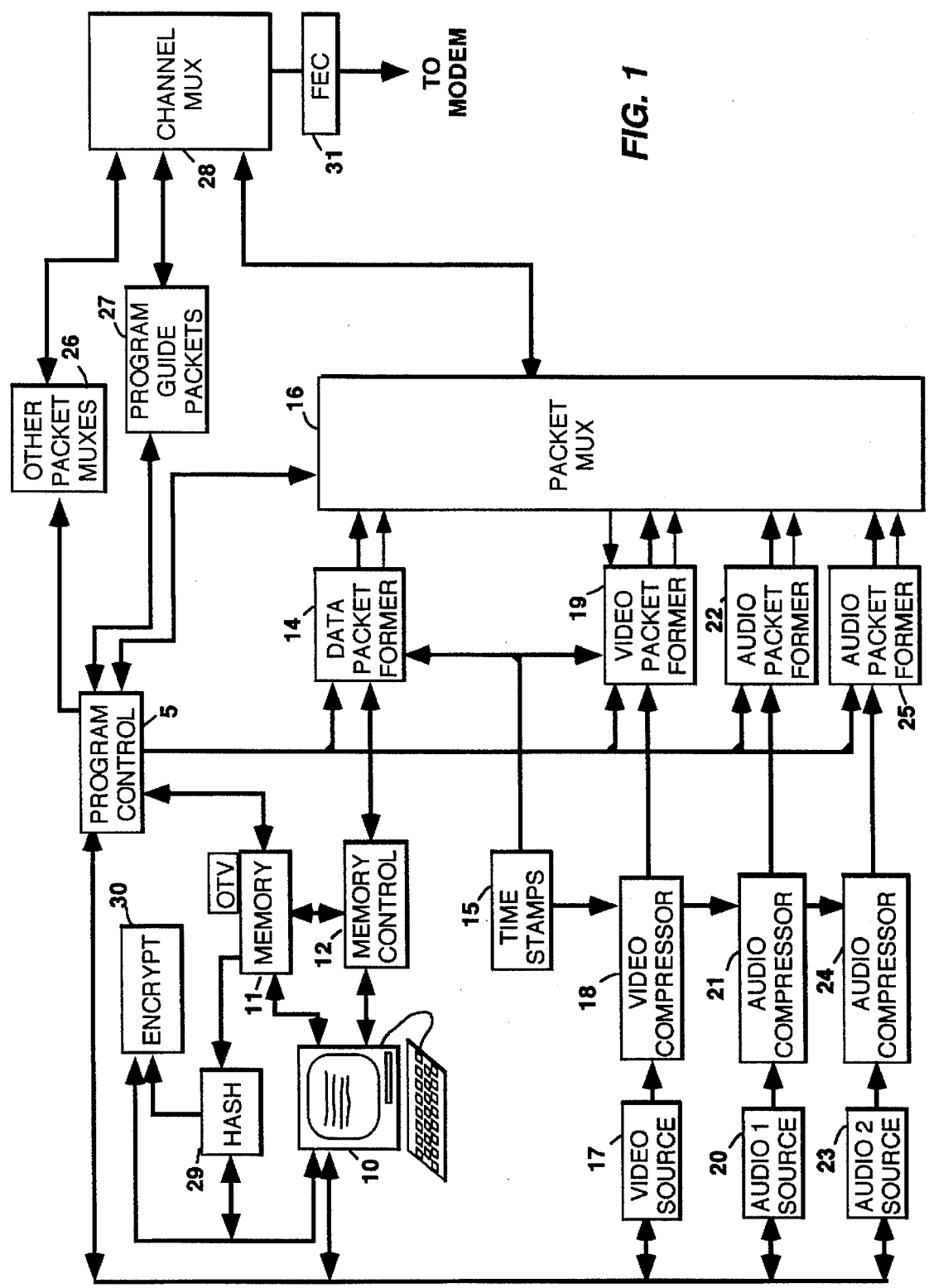
FIG. 1 is a block diagram of an interactive TV signal encoding system embodying an aspect of the present invention.
Figure 2:
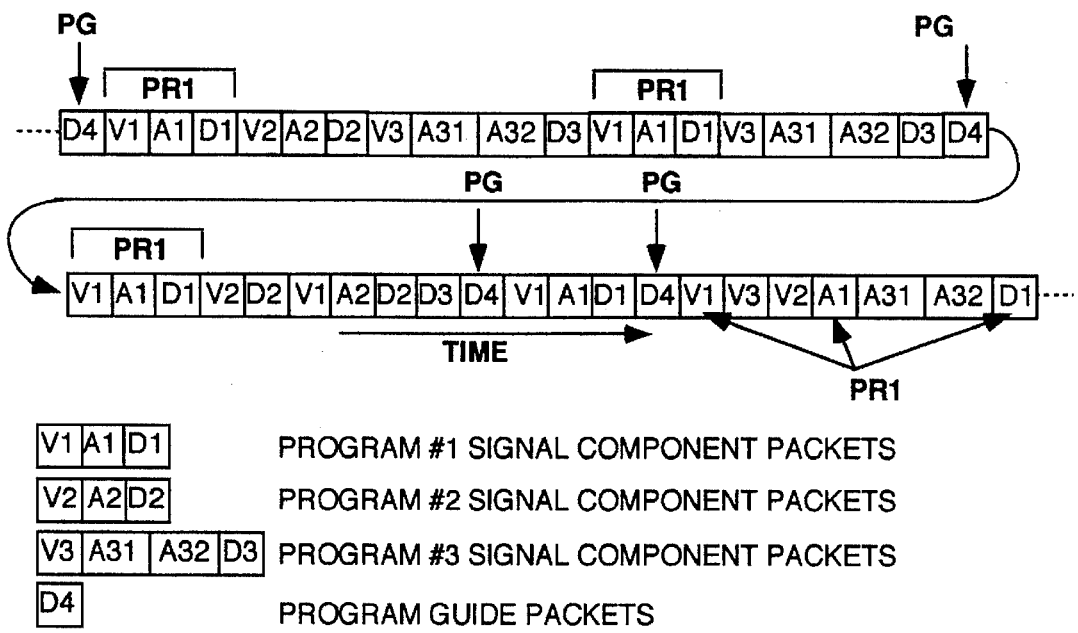
FIG. 2 is a pictorial diagram of a portion of an exemplary AVI signal
Figure 3:
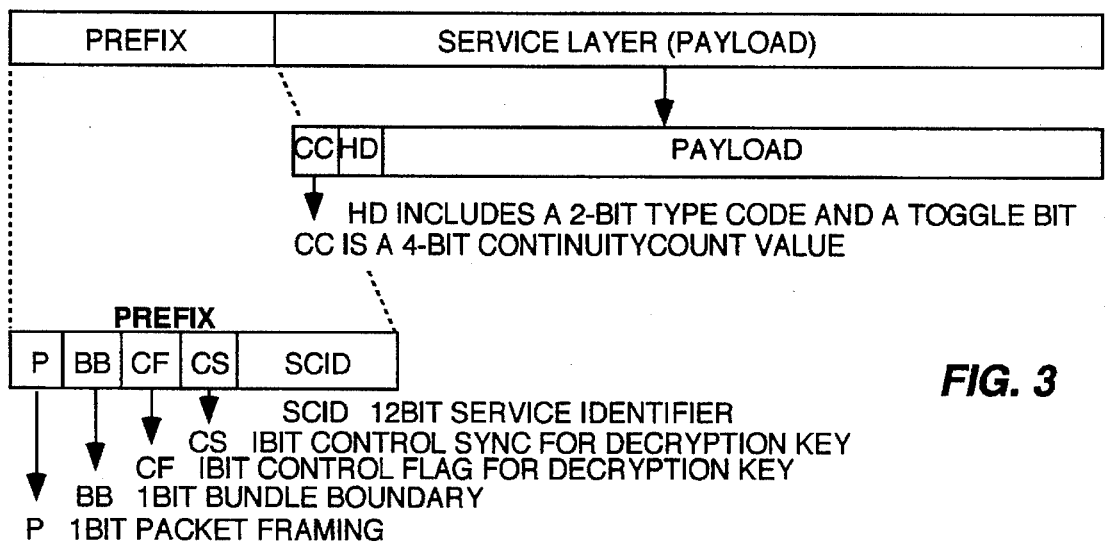
FIG. 3 is a pictorial diagram of an exemplary transport packet

Referring to FIG. 1, a packet multiplexer 16 provides, at its output port, an audio-video-interactive (AVI) program. Similar such devices 26 generate alternative AVI programs. A program guide, which includes information associating the audio, video and interactive components of respective AVI programs via service channel identifiers (SCID's), is provided in a transmission format similar to the AVI programs by a processing element 27. The program guide and respective AVI programs are applied in transport packet form to respective input ports of a channel multiplexer 28. The channel multiplexer 28 may be of known construction for equally time division multiplexing respective packet signals into a single signal stream or it may be a statistically controlled multiplexer. The output of the multiplexer 28 is coupled to a forward error coding (FEC) and signal interleaving apparatus 31, which may include Reed-Solomon and Trellis encoders. The output of the FEC 31 is coupled to a modem wherein the multiplexed signal is conditioned for application to, for example a satellite transponder. An exemplary statistically multiplexed packet signal is illustrated in FIG. 2, and an exemplary format for respective packets is illustrated in FIG. 3.

AVI formation is controlled by a system program controller 5. Program controller 5 may have a user interface by which particular programs and respective program signal components are selected. The program controller assigns respective SCID's for respective audio, video and interactive components of respective programs. The presumption is made that respective receivers will access a program guide to determine which SCID's associate AVI program components, and then select transport packets from the transmitted signal stream containing the associated SCID's. The audio, video and interactive components are assigned different SCID's so that one or more of the components of one AVI program may conveniently be utilized in the formation of alternate AVI programs. Using differing SCID's also facilitates editing audio from one program with video from another etc.

A given AVI program may include a variety of signal component sources. Shown in FIG. 1 are an interactive component source 10, a video source 17, and first and second audio sources 20 and 23 (bilingual audio). The controller 5 communicates with respective sources for time management and/or enabling functions. The source of video signal 17 is coupled to a video signal compression apparatus 18, which may compress signal according to the video compression standard promoted by the Moving Pictures Experts Group (MPEG). Similarly the respective audio signals from the sources 20 and 23 are applied to respective compression apparatus 21 and 24. These compression apparatus may compress the respective audio signals according to the audio compression standard promoted by the Moving Pictures Experts Group (MPEG). Associated audio and video signals compressed according to the MPEG protocol are synchronized with the use of presentation time stamps (PTS), which are provided by a timing element 15. For insight into how the audio and video may be temporally related, the reader's attention is directed to INTERNATIONAL ORGANIZATION FOR STANDARDIZATION, ISO/IEC JTC1/SC29/WG11; N0531, CODING OF MOVING PICTURES AND ASSOCIATED AUDIO, MPEG93, SEPTEMBER, 1993.

The compressed audio and video signals are applied to transport packet formers or processors 19, 22 and 25. Audio and video transport packet processors are known and will not be described. Suffice it to say that the packet processors divide the compressed data into payloads of predetermined numbers of bytes and attach identifying headers including SCID's, as indicated in FIG. 3. For detailed information on a video signal transport packet processor, the reader is directed to U.S. Pat. No. 5,168,356. The packet processors are coupled to the packet multiplexer which time division multiplexes the signal components. The transport packet processor may include a buffer memory for temporarily storing packetized data to accommodate the multiplexer servicing other components. The packet processors include PACKET READY signal lines coupled to the multiplexer to indicate when a packet is available.

Interactive programs are created, via known techniques, by a programmer operating the interactive component source or programming element 10, which may be a computer or personal computer (PC). In forming the application the programming element 10 interfaces with a memory 11 and memory controller 12, and the completed application is stored in the memory 11. After completion, the application may be condensed or translated to some native code to conserve signal bandwidth.

Figures 4, 5:
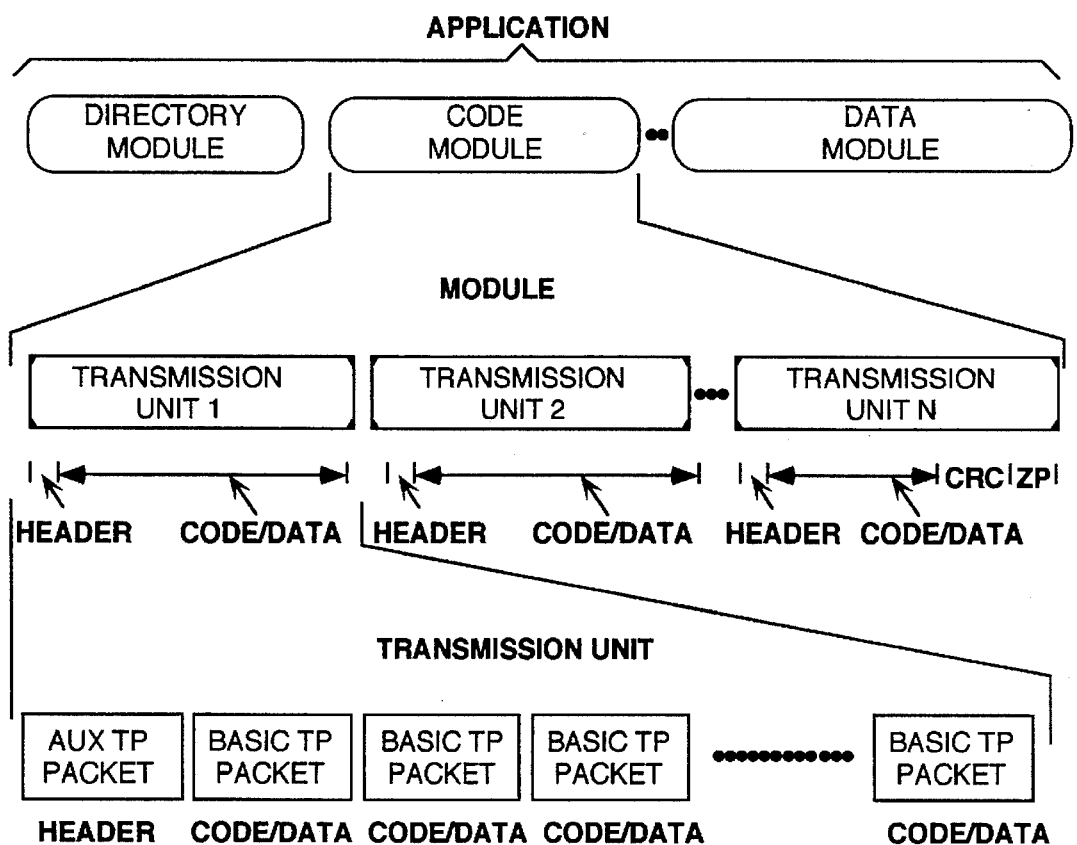
FIG. 4 is a pictorial diagram of the format of an exemplary AVI application, useful in describing the invention.
FIG. 5 is a table of the contents of an exemplary transmission unit header.
Figure 7:
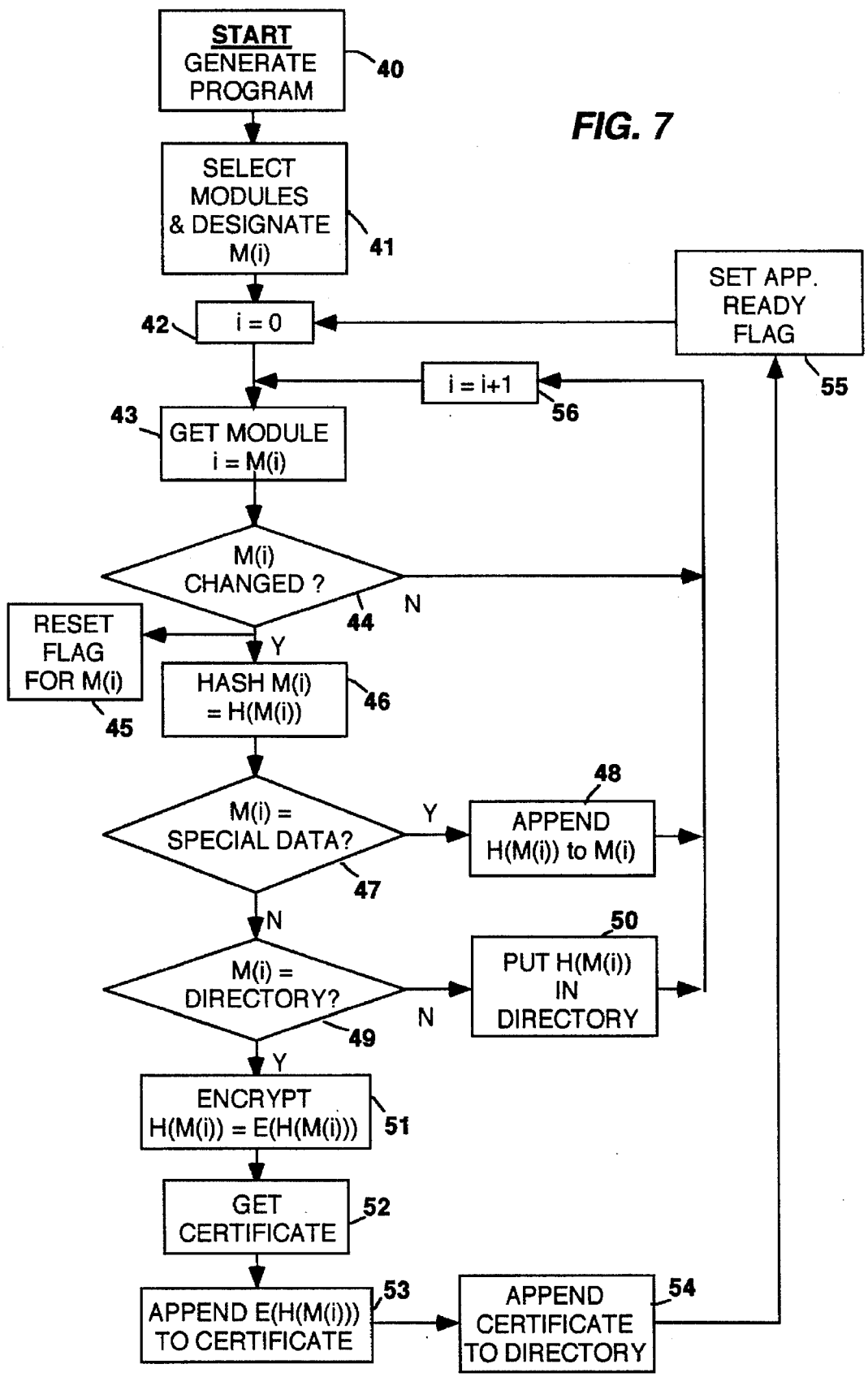
FIG. 7 is a flow diagram illustrative of the process of applying security/protection to an AVI application embodying the invention.

In the formation of the application, portions of the programs are formatted into modules, transmission units and packets as shown in FIG. 4. The packets are similar in form to the transport packets described above. A transmission unit consists of a plurality of transport packets. Each transmission unit includes a header packet which includes information descriptive the transmission unit contents, and a plurality of basic packets each of which includes a portion of the codewords of the application. A module is divided into transmission units to facilitate interleaving of information from different modules. Preferably, interleaving of transmission units is permitted, but interleaving of transport packets from different transmission units is not. For a more detailed description of the formation of an application and transmission units etc. the reader is referred to United States Patent No. (Ser. No. 08/234,139 allowed).

Modules are similar to computer files, and are of different types. A first type of module is a Directory Module which contains information to interrelate respective transmission units and modules as an application. A second module type is a Code Module which comprises executable code necessary to program a computing device at a receiver to perform or execute the application. A third module type is a Data Module. Data Modules include non-executable "data" used in the execution of the application. Data Modules tend to be more dynamic than Code Modules, that is Data Modules may change during a program while Code Modules generally do not. A fourth type of module is designated a Signal Module. This module is a special packet including information to trigger receiver interrupts, which may be utilized for synchronization of e.g., video with application program features, or to suspend operation of an application, or to re-enable operation of a program etc. Synchronization is effected via inclusion of presentation time stamps. Data Directory, Code and Signal Modules are examples of the PC-data.

The respective modules may be error coded by the programming element 10. For example the entire module may undergo cyclic redundancy coding CRC, and error check bits may be added to the end of the module.

Each transmission unit, TU, is configured with a header including information about the TU. Table I, shown in FIG. 5, illustrates exemplary types of information included in each TU header packet. The header includes a version number. The version number is included to indicate when a change is made to the application during the presentation of the AVI program. A receiver decoder may be arranged to update an executing application responsive to detecting a change in version number. The Module ID is similar to a computer file identifier and is provided by the application programmer. The Module Transmission Unit Byte Offset is a number which indicates the byte location in the module of the first code/data byte of the payload of the TU. The Length (bytes) Of Transmission Unit indicates the size of the TU and/or the location of the last code/data byte in the TU.

Table II of FIG. 6 illustrates representative types of data included in the Directory Module. The Directory Module includes a header with an Application identifier, AID, a field indicating the application type, a field which includes type qualifiers, a field which indicates the amount of memory required to store and execute the application, a field indicating the number of modules contained in the application, and a field or fields (FIRST SECURITY INFORMATION) which may include security data such as authenticating data. It will be appreciated that the respective fields listed above, or those that follow, need not occur in the order illustrated. A data portion of the Directory Module includes data for each module similar to the header data for the respective modules. In addition there is a string table which is a list of respective application module names in ASCII format. The data section for each module may also include a field or fields (FURTHER SECURITY INFORMATION) for security data related to the respective module. Alternatively, this data may be included with the more general directory information in the first security information field. The contents of the module security information fields will be discussed in detail below.

For transport packet formation, the interactive component source 10 may be programmed to generate the actual transmission units and transport packets, however in the embodiment of FIG. 1, a separate code/data packet processor 14 is included. The code/data packet processor accesses the respective areas of the memory 11 through the memory controller 12 and generates packets in a sequence representing a respective application (FIG. 4).

The packet multiplexer 16 is arranged to provide packets according to a particular schedule. The schedule is nominally determined by the bandwidth requirements of the AVI components. If there is multiplexing contention between the respective AVI components it is preferred that the signal component with packets that occur least frequently be assigned the higher multiplexing priority.

The specifics of the packet multiplexer 16 will not be described because multiplexing is a mature art and those skilled in digital signal processing will readily be able to design a multiplexer to satisfy their particular requirements. Suffice it to say that the packet multiplexer 16 may be arranged using three state logic switches with input ports coupled to the respective component signals and their output ports coupled to the multiplexer output port. A state machine may be arranged to control the logic switches responsive to priorities established by the controller 5 and the respective packet ready signals provided by the packet formers.

Security in the AVI system is based on the close integration between techniques implemented by the AVI system controller and security codes resident in all AVI system compliant receivers. The security is based on public key cryptography using the Rivest, Shamir, and Adleman, RSA, algorithm or the Data Encryption Standard, DES. The algorithm preferred by the present inventors is the RSA algorithm, using modulus and exponent sizes which are respectively multiples of four (eight-bit) bytes. The general type of security protection resides in authentication of a certificate supplied with Directory Modules, and hash values generated over respective other application modules.

A special class of RSA protocols is that in which the public exponent is 3. An advantage resides in the fact that signature checking speed may be enhanced by inclusion of "helping" information of the type described below.

Consider that a receiver is to verify that S is a RSA signature over data D, where the public modulus and exponent are N and 3 respectively. To verify, the receiver essentially has to show that $S^3=D(\mod N)$. Nominally this requires a division/modulo operation by N, which is computationally difficult and time consuming. Since multiplication is a computationally simpler and faster operation, a checking operation which relies on multiplication rather than division will significantly speed up the operation.

Consider the quotients Q1 and Q2 defined as follows $S^2/N=Q1+R1$; $S*R1/N=Q2+R2$; $R2=D$; if $S^3=D(\mod N)$. That is, the values Q1 and Q2 are whole number quotients derived from the signature by division by N. R1 and R2 are respective remainders after division. Given any N, S and D of size at most T bits, where S<N and D<N, then there exist quotients Q1, Q2 of size at most T bits which will verify $S^3=D(\mod N)$ using the algorithm outlined immediately below. If the values Q1 and Q2 are calculated by the application programmer (e.g. in non-real time) and transmitted within the Directory Module with the signature S, it can be shown that a fast check on the signature may be performed as follows.

At the receiver, extract S, Q1, Q2 from the Directory Module and;

| | | |
|---|---|---|
| 1. compute | $A = S^2$ | |
| 2. compute | $B = Q1$ times $N$ | |
| 3. compare | $A > B$; | If A< B quit, signature cannot check, |
| | else if $A > B$ | |
| 4. compute | $C = A - B$ | |
| 5. compare | $C < N$; | If $C > N$ quit, signature cannot check, |
| | else if $C < N$ | |
| 6. compute | $E = C$ times $S$ | |
| 7. compute | $F = Q2$ times $N$ | |
| 8. Compare | $E > F$, If $E < F$ quit, signature cannot check, | |
| | else if $E > F$ | |
| 9. compute | $G = E - F$ | |
| 10. Compare | $G = D$, if not, signature does not check. | |

Note that all arithmetic operations are simple multiplications or subtractions. The detection of an erroneous signature may occur at steps 3, 5, 8 or 10. If an erroneous signature is detected at steps 3 or 5, very little computational time has been expended.

The AVI receivers are provided with the public keys (and desirably helping quotients Q1 and Q2) of the respective system providers for decrypting signed certificates included with PC-data to determine program authenticity. If program authenticity is not confirmed, the received application is immediately dumped from the receiver. Central to such a security system is the assignment of unique identifiers, ID's, to application providers and the system controller or server. The system controller allocates unique e.g. 32-bit ID's to each trusted AVI application provider and also issues a certificate for the application provider's public key. The certificate is essentially the system controller's digital signature on the application provider's public key and includes fields such as the expiration date of the certificate, the ID of the provider, and a limit on the amount of storage an application with this ID can use in the file system of the receivers. The system controller may employ a plurality of different private-public key pairs, and the certificate may include flags to designate which of the plurality of public keys the receiver should use to decrypt respective certificates.

A certificate for application providers will nominally include:

CERTIFICATE_FLAGS (which identify the certificate type and may include the system controller's public key flag);

PROVIDER_ID, (which indicate length of provider ID);

PROVIDER_EXPIRE, (which indicates application lifetime);

PROVIDER_AUTHORIZATION_FLAGS,

PROVIDER_STORAGE_LIMIT, (which indicates allotted receiver memory);

PROVIDER_NAME, (the application provider's name)

PROVIDER_FIXED_CERT, (which is the providers public key).

This foregoing certificate information is hashed modulo 128, and the hash value is appended thereto.

The CERTIFICATE_FLAGS mentioned above include authorization flags which grant/deny the receiver processors access to privileged actions. Examples of representative privileges accessed via flags are listed immediately below and include;

1. the ability to be downloaded from a broadcast link;
2. the ability to be downloaded from a local link (e.g. connected via a local IRD port);
3. the ability to be downloaded from a local remote link (e.g. via a telephone link);

4. The ability for an application to switch tracks in the context of the same program (e.g. to switch between video tracks 1 and 2);
5. the ability to establish a broadcast connection (e.g. to change TV programs or channels);
6. the ability to establish a local connection;
7. the ability to establish a remote connection;
8. the ability to control external devices;
9. the ability to download unchecked modules;
10. the ability for an application to use cryptographic features:
11. the ability for an application to request the user for permission to access files which have user restrictions; and
12. the ability to activate a resident OCODE monitor for remote debugging.

These flags are part of both the provider certificate and the application authorization field directory. An application must have the authorization flags set at both locations before it is permitted to perform the privileged action. Respective receivers contain a BOX authorization mask, in nonvolatile storage, which is programmed to permit access to particular privileges, or to prevent certain privileged actions.

Each application provider selects his own cryptographic public-private key pair, and has his public key certified by the AVI system controller (for example by notarized request). The application provider is constrained by certain guidelines in selecting the public key. The constraints relate to the capabilities of the receiver hardware. In particular, near term consumer electronic receivers will include minimal memory and relatively unsophisticated processors, factors which affect authentication processing speeds and times, and thus the size and form of public keys. Examples of constraints may be that public keys are to be 512 bits or less and that the number of bits be a power of two etc.

A special group AVI system ID may be reserved for programs designed to perform receiver or system maintenance. This system ID will be attached with a service provider ID. If a program contains both the special group ID and an authentic provider ID, the corresponding maintenance program may obtain access to more secure portions of the receiver, depending upon the ID of the particular provider. For example the application provider may be the system controller and the attached application may be for updating entitlements in a smart card, or performing a system performance check. Alternatively, the application provider may be associated with impulse buying commercials and the program may be related to checking a users debits against his credit, or to facilitate revenue collection, etc. On the other hand, if a group ID is not the special group AVI system ID, the functions available to the application may be limited to functions available to all applications.

Manufacturers of particular receiver apparatus may be assigned special manufacturer ID's. Any application having the manufacturer ID may be authenticated by a special authentication process, resident in the receiver, and implemented by the manufacturer during assembly of the receiver. Programs containing the manufacturer ID will access only receivers produced by the particular manufacturer, and may function to access a particular set of functions built into the receiver by the manufacturer. This type of application may be utilized to upgrade receiver operating software.

There may also be network operators who have software/hardware resident in particular receivers. These network operators may also be assigned special ID's to allow selective access to the software/hardware of all network receivers. The network operators may include their own authentication process resident in the software/hardware of the network receiver.

Whether an application is a special system type, or a manufacturer type or a network type is indicated in the Directory Module (Table II) in the Application Type field. The Application Qualifier field may include information identifying the manufacturer, or network operator, etc.

Security is applied to an application as follows. After an application provider has generated an application and formed respective modules including the Directory module, he determines which parts of the application are to be protected. In all instances the Directory Module will be protected. In addition each module containing an entry point will be protected. Modules without entry points are protected at the providers discretion, and Data Modules are protected at the providers discretion. It should be recognized that portions of the data in data modules may frequently change, and thereby put a relatively heavy security processing burden on the encoder and receiver, if Data Modules are protected. Therefor Data Modules may frequently be transmitted unprotected. Having selected the modules to be protected, the provider forms a list of the modules selected for security protection, and the mode of protection for respective modules, and enters this list in the Directory Module in the fields designated security information. In a particular AVI system this module list may be included in general directory information i.e., the first security information portion of the Directory Module. In an alternative AVI system, information indicating whether a particular module is protected may be included only in the further security information fields of the respective module in the directory. Part of the receiver system programming will include a routine to examine the Directory for module security information, and perform security processing on respective modules according to this information.

Module protection may take several forms. The first is simply to encrypt the selected module with the application providers private key. A second method is to perform a "hash" function over the module and include the "hash" value in the Directory Module in the further security information field for the respective module. A third method is to perform a hash function over the module, include the hash value in the Directory Module and encrypt the selected module with the application providers private key. A fourth method performs a hash function over the selected module, attaches the hash value to the module, encrypts the module plus hash value, and places a replica of the encrypted hash value in the Directory Module. In each of the foregoing examples, security processing of the Directory Module is done after all other modules are processed and the security information for respective modules has been entered in the Directory Module.

The preferred method comprises performing hash functions over respective modules, inserting the respective hash values in the further security information fields of the directory module and subsequently performing a hash function over the Directory Module. The hash Value of the Directory Module is then encrypted with the providers private key.

A trusted application provider will be assigned a signed certificate which includes items such as the providers public key, the providers ID, an expiration date of the certificate, possibly the amount of storage allocated the provider at the receiver etc. This certificate is signed with the system controller's private key. The encrypted hash value is appended to the signed certificate and the combination is appended to the Directory Module. The directory Module and all other modules are provided to the system controller in plaintext. Data Modules which are selected for protection and which are frequently changing, are protected by means of a signature of the provider on the hash value over the Data Module, which signature is made part of the respective module.

It is possible that the application provider is in fact an overseer of a subgroup of lesser application providers. In this instance, the application provider may provide a sub-certificate signed with the application providers private key and including a sub-providers public key, the sub-providers ID, an expiration date of the certificate, possibly the amount of storage allocated the sub-provider at the receiver etc. This sub-certificate will also be appended to the Directory Module along with the certificate assigned the application provider.

The preferred mode of protection is not secure in that it does not preclude prying eyes from detecting/interpreting the transmitted information. However the protection, i.e., inclusion of the certificate and hashing of the data, is advantageously simple to perform and does provide assurance that the data comes from an authorized source and that the integrity of the received data is insured, (if authenticated at the receiver).

Untrusted application providers, i.e., providers who may be careless in application generation and threaten the integrity of an AVI service, are not provided certificates to be appended their respective applications. Applications provided by untrusted providers are subjected to certification by a trusted certifying authority. The certifying authority may inspect the integrity of the application and then process the applications of the untrusted application providers for protection purposes, and ultimately pass the processed application to the system controller.

Security processing will be further described with reference to FIGS. 1 and 5. FIG. 1 includes distinct hashing and encrypting elements 29, and 30, however it will readily be recognized, by ones skilled in the art of digital signal processing, that both functions may be performed in software executed by the μPC or digital signal processor, DSP, which may be included in the element 10. Once the application has been generated and stored {40} in the memory 11, the programmer will select/determine {41} the modules which are to be security protected. These modules will be tagged with an index (i). The Directory Module is assigned the highest index so that it will be processed last. Each module to be processed is assigned a "Change" flag which is set to a "1". The AVI system repeatedly transmits the application during an AVI program. Nominally Code and some Data Modules remain unchanged during the program, but some e.g., Data Modules may change. During the repeated transmissions of the application it is preferred not-to re-process unchanged modules for security, but rather only to reprocess the modules which actually change. The "Change" flags are established to alert the security processing function which modules require re-processing clue to changes during the duration of a program. Initially the "Change" flag of each module to be security protected is set to the change mode. The element 10 also determines if a certificate from the system controller is available.

An operating index "i" is set to zero {42} and the first module, M(O), is accessed {43} from the memory 11. The "Change" flag for the module is tested {44} and reset {45}. If the module has been previously processed and the "Change" flag indicates no change, the system jumps to step {56}, increments the index "i" and accesses the next module. If the "Change" flag indicates that a change has occurred in the module, it is applied {46} to a HASH function processor 29. The particular hash function is maintained relatively simple to limit processing requirements imposed on respective receivers. The function is preferably a one-way function. The hash function should be computationally fast and extremely difficult to decipher or break. An exemplary hash function is based on a vector W of 256 codewords $w_x$ each 128 bits in length. Data to be hash processed (hashed) is segmented into 256-bit exclusive blocks of data D, where D=$d_1$, $d_2$, $d_3$, $d_4$, $d_{256}$. A basic hash function BH(D) is defined:

$$BH(D) = \sum_{x=1}^{256} d_x w_x \mod 2^{128}.$$

If there are n blocks of data D, n values, $B_1$, $B_2$, $B_3$, $B_n$, each 128 bits in length, of the function BH(D) will be generated. To compute the hash over the whole data, the intermediate results $B_i$ are combined as follows: Let <Bi,Bj> represent the 256 number obtained by concatenating the 128 blocks Bi and Bj. Then define H(D), the hash over the data as;

$$H(D)=BH(<BH(\ldots(<BH(<B_1,B_2>),B_3>),B_4>),\ldots),B_n>).$$

Alternatively the function H(D) may be of the form;

$$H(D)=B_1 \text{XOR } B_2 \text{XOR } B_3 \text{XOR} \ldots B_n.$$

A preferred hash function for hashing modules, is the publicly known function MD5 (MD stands for Message Digest and MD5 is described by R. Rivest, THE MD5 MESSAGE DIGEST ALGORITHM, RFC 1321, April 1992). Once the module is hashed, the module is tested {47} to determine if it is expected to be changing during the program. If it is expected to change, the hash value H(D) is not placed in the directory, by rather is appended {48} to the module stored in the memory 11. (Alternatively, the hash value may be signed (encrypted) with the providers private key, and then appended to the module stored in memory 11). The index i is incremented {56} and the next module is accessed from memory. If at {47} the module is determined not to change, a test {49} is made to determine if the module is the Directory Module. If it is not, the hash value H(M(i)) for module M(i) is placed in the Directory Module {50} in either the first security information field, or in the further security information field for the respective module. The index i is incremented {56} and the next module is accessed from memory.

If at test {49} the module is determined to be the Directory Module, the hashed value H(M(i)) is applied to the encryptor 30 wherein it is encrypted with the application providers private key. (If desired, the entire Directory Module may be applied to the encryptor for encryption at this juncture.) The certificate is fetched {52} and the encrypted hash value is appended thereto {53}, and the certificate with the hash value appended is attached {54} to the Directory Module in memory 11. A flag is set {55} which indicates to the data packet processor/program controller, that the program is ready for transmission. The system jumps to step {42} and the index is reset to zero. The system then proceeds to check if modules change and only changed modules are rehashed, during repeat transmissions of the application during a program. As noted earlier, an application provider may include other signed information/certificates which may be appended to the Directory Module. Signing of such information is performed in the encryptor 30 using the providers private key.

In an alternative embodiment, the encryption step 51 may be eliminated. In a still further embodiment, all hash values for all hashed modules may be encrypted.

Figure 12:
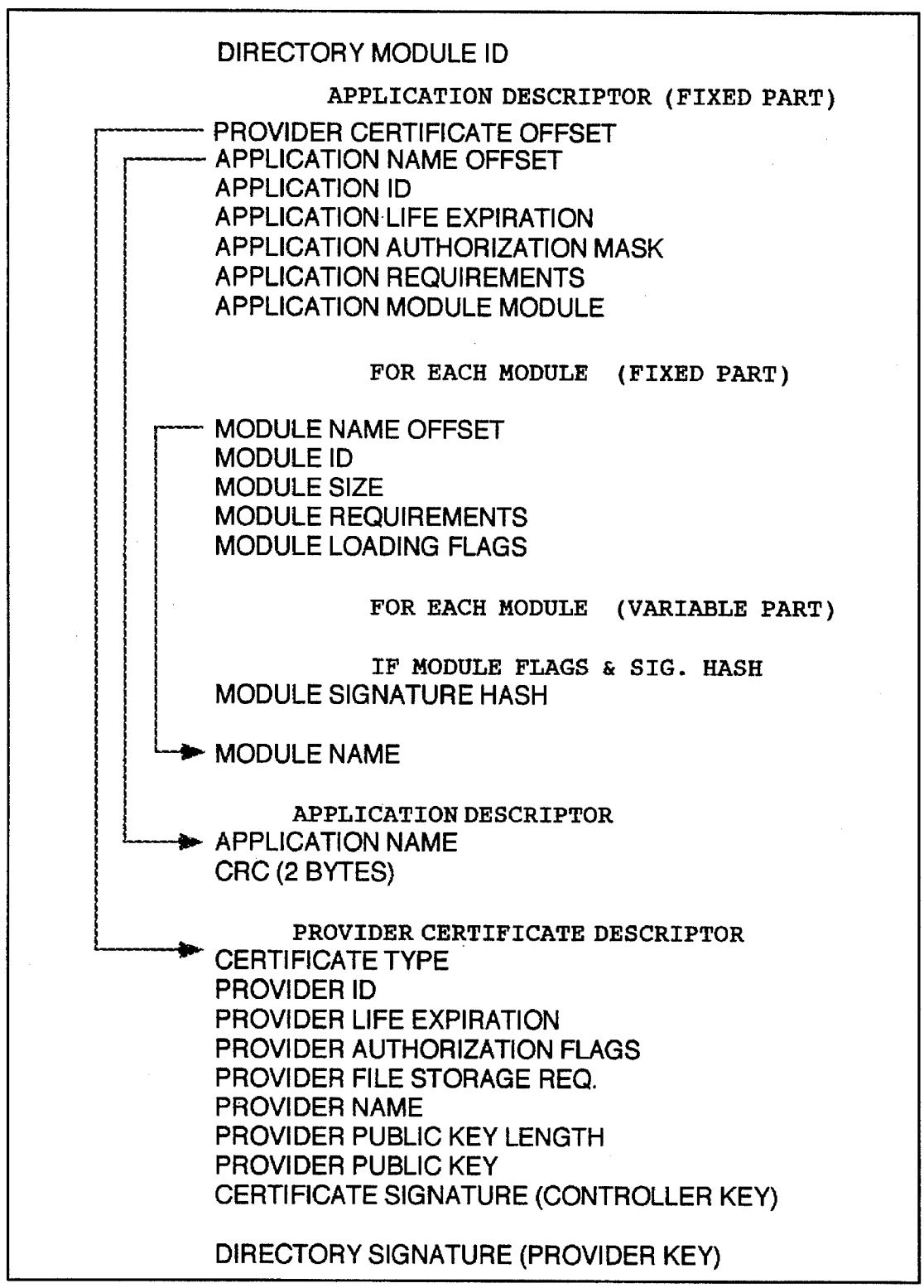
FIG. 12 is a pictorial representation of a preferred Directory Module format according to the invention.

FIG. 12 illustrates the format of a preferred Directory Module. The Directory Module is in plain text. Only the Directory signature (hash value) and the certificate are encrypted, the former with the provider's key and the latter with the system controller's key. In addition, when respective modules are hashed, each such module may be preceded with an ASCII version of some predetermined text associated with the system controller/provider such as the text "OpenTv(™)" before hashing, so that respective module signatures are, for example, the hash value H(OpenTv(™)+Module), and the Directory Module signature is the encrypted value of H(OpenTv(™)+Directory Module). This is indicated in FIG. 1 with the box OTV attached to the memory 11, and is meant to imply that a digital version of the text "OpenTv(™)" is stored therein and may be multiplexed with the respective modules when they are read out and applied to the hash function element 29.

The Directory Module in FIG. 12 illustrates the preferred format for the AVI system designated OpenTv™ being developed by Thomson Consumer Electronics Inc. The formats of certificates, public keys and signatures used therein are described immediately below.

All certificates, keys and signatures will have multiple byte fields in BIG-ENDIAN format. This architecture independent format facilitates portability across different receiver architectures. Any OpenTV certificate is a combination of a fixed structure followed by a variable length part, which includes the public key being certified and the signature of the OpenTV controller.

There are two classes of certificates that will be issued by the OpenTV controller.

1. Producer(provider) Certificates which are given to application producers.
2. Server (system controller) Certificates which are specific to a transaction server to which applications from a producer (provider) can establish secure communications.

In addition, a USER certificate may be issued by the controller. This certificate will never be parsed internally by OpenTV, but only made available to the external world. The OpenTV system will only know the size of this certificate. Apart from an Open TV specific 4 byte header, the remainder of the certificate structure may be maintained confidential, and may be a standard X.509 certificate.

The following are the sizes for common parts of certificates.

CERTIFICATE_FLAGS_LENGTH (4 bytes)
PUBLC_KEY_SIZE_LENGTH (4 bytes)

An OpenTV controller issued certificate starts with a 32-bit flag structure which describes the certificate. The location and meaning of the various flags are described thusly.

The flag for possible extensions to the OpenTV certificate structure is set for the Basic Open TV certificate; not to be set for extensions. The flags are defined as follows BASIC_CERTIFICATE (0x80000000)

Exactly one of the following 3 flags will be set.

SERVER_CERTIFICATE (0x40000000)
PRODUCER_CERTIFICATE (0x20000000)
USER_CERTIFICATE (0x10000000)

There is divergence between the SERVER/PRODUCER certificates and the USER certificates as to the interpretation of the 32 bit field. If the certificate has the appearance of a USER certificate then the last 16 bits of the field are actually its size including the initial 32 bit field.

Regarding the SERVER/PRODUCER flags, after examining the first four bits, the entity being certified is known, or the certificate is considered to be an extension beyond the current system. The next four bits indicate which OpenTV controller public key has been used to generate the signature. They represent a number N from 0–15. If $0 \leq N \leq 14$, the N'th embedded public key is to be used. If N=15 then the public key to be used is the latest key received through an EXTERNAL trusted channel. Internally in the system the key numbers can only increase. That is, if internally the key is 5 and a certificate with key 6 occurs and is verified, then the internal key becomes 6 and certificates with keys less than 6 will not be accepted. Finally, if and when all internal keys break, the public key would be accepted only from EXTERNAL trusted channel.

The next byte is reserved for a description of the certificate. Currently it is unused. The next two bytes provide information about the Producer/Server and the Key being certified. The first byte contain flags describing the algorithm with respect to the public key; this is common to both server and producer. The next and last byte are different for Producer and Server so they are described separately.

The algorithm byte flags are:

RSA_3_WITH_MD5 (0x00008000)
RSA_WITH_MD5 (0x00004000)

The last byte for the PRODUCER certificate currently has no flags defined. The last byte for SERVER certificate currently has one flag defined to indicate whether the server is constrained. From a functional standpoint, the constrained server does not require any information about the connecting party when it first establishes a secure link. This makes link establishment much faster.

SERVER_CONSTRAINED (0x00000080)

The externally available fixed part of a Producer Signature consists of a two byte flags field which specifies the type of signature, and a 2 byte field which gives the size of the signature.

PRODUCER_SIGNATURE_FLAGS_LENGTH (2 bytes)
PRODUCER_SIGNATURE_SIZE_LENGTH (2 bytes)

Currently only one flag is meaningful, the assisted flag. If the producer's signature algorithm is RSA_3_WITH_MD5, as specified in the certificate for the producer then the producer has the option of adding additional help data after the signature for faster checking, and this is designated PRODUCER_SIGNATURE_ASSIST (0x8000)

The Public Key Structure (for RSA) for producers, servers and OpenTV boxes will now be described. For portability, the modulus and exponent sizes MUST BE A MULTIPLE of 4 BTYES. Also OpenTv requires that if a modulus size is stated to be S bytes, then the first 32 bits of the modulus when represented in big endian format must be NON ZERO. This is not a limitation since the size can then be stated to be S-4 or less.

The public key consists of:
fixed_public._key_t,
followed by
exponent (in big-endian byte format)

followed by modulus (in big-endian byte format)

A producer/server certificate consists of a cleartext part which contains a descriptor of the certificate by the OpenTV controller followed by the public key of the producer/server of data type described above. In addition there is an enciphered part which is the digital signature S of the OpenTV controller on data which depends on the cleartext data. A producer/server at this stage has a choice of either using only S or adding additional data (e.g., Q1 and Q2) beyond the signature to make it easier to check.

The producer/server needs to add 4 bytes of information between the Cleartext and the Signature S, and possibly some information beyond S to assist in checking. The 4 bytes of information include fields for flags and the size of the total amount of data consisting of the signature and help information. The sizes of these two fields are:

CERTIFICATE_SIGNATURE_INFO_FLAGS_LENGTH(2 bytes)

CERTIFICATE_SIGNATURE_SIZE_LENGTH (2 bytes)

Only one flag is currently defined, the RSA_3_ASSIST flag. If set, there is help information beyond the signature S, which are the two quotients Q1, Q2 described herein above. This flag is defined;

RSA_3_ASSIST (0x8000).

The foregoing describes the state of encryption at the module level. This may be overlain with a further encryption at the transport packet level. That is, when respective modules are divided into transport packet payloads for transmission, the payloads may be encrypted independent of the authentication process.

Returning to the general description of the system, two way communications between providers and receivers, by telephone modem for example, will incorporate encrypted communications using RSA or Data Encryption Standard, DES cryptography for example. The session key will be set up using public key cryptography. An application must present a certified version of the public key of the server with which it wishes to communicate. A session key is established only if the application provider's ID matches the server ID on the certificate, and the key exchange will use the public key contained in the certificate.

FIG. 8 illustrates in block form, a portion of AVI signal receiver or IRD including elements of an inverse transport packet processor. Signal is detected by an antenna 80 and applied to a tuner detector, 81, which extracts a particular frequency band of received signals, and provides a baseband multiplexed packet signal. The frequency band is selected by the user through an IRD system controller 89 (hereafter IRD controller) by conventional methods. Nominally broadcast AVI signals will have been error encoded using, for example, Reed-Solomon forward error correcting (FEC) coding. The baseband signals will thus be applied to a FEC decoder, 82. The FEC decoder 82 synchronizes the received video and provides a stream of signal packets of the type illustrated in FIG. 3. The FEC 12 may provide packets at regular intervals, or on demand, by for example, memory controller 87. In either case a packet framing or synchronizing signal is provided by the FEC circuit, which indicates the times that respective packet information is transferred from the FEC 82.

Only packets from a single AVI signal may be processed by the receiver at one time. In this example it is assumed that the user has no knowledge of which packets to select. This information is contained in a program guide, which is a special program consisting of data which interrelates program signal components through their respective SCID's. The program guide is a listing for each program, including the SCID's for the audio, video, and data components of respective programs. The program guide (packets D4 in FIG. 2) is assigned a fixed SCID. When power is applied to the receiver, the IRD controller 89 is programmed to load the SCID associated with the program guide into a SCID detector 84, which may be a bank of matched filters. When the program guide SCID is detected, the memory controller 87 is conditioned to route the corresponding packet payload to a predetermined location in the memory 88 for use by the IRD controller.

The IRD controller waits for a programming command from the user via an interface 90, which is shown as a keyboard, but which may be a conventional remote control, or receiver front panel switches. The user may request to view a program provided on channel 4 (in the vernacular of analog TV systems). The IRD controller 89 is programmed to scan the program guide list that was loaded in the memory 88 for the respective SCID's of the channel 4 program components, and to load these SCID's in the SCID detector 84.

Received packets of audio, video or data program components, for a desired program, must ultimately be routed to the respective audio 93, video 92, or auxiliary data 91, (94) signal processors respectively. The data is received at a relatively constant rate, but the signal processors nominally require input data in bursts (according to the respective types of decompression for example). The exemplary system of FIG. 8, first routes the respective packets to predetermined memory locations in the memory 88. Thereafter the respective processors 91–94 request the component packets from the memory 88. Routing the components through the memory provides a measure of desired signal data rate buffering or throttling.

The audio, video and data packets are loaded into respective predetermined memory locations to enable the signal processors easy access to the component data. Payloads of respective component packets are loaded in the appropriate memory areas as a function of the corresponding SCID's, and control signals provided by the SCID detector. This association may be hardwired in the memory controller 87, or the association may be programmable.

The respective signal packets are coupled from the FEC 82 to the memory controller 87 via a signal descrambler 86. Only the signal payloads are scrambled and the packet headers are passed by the descrambler unaltered. Whether or not a packed is to be descrambled is determined by the CF flag (FIG. 3) in the packet prefix, and how it is to be descrambled is directed by the CS flag. This packet scrambling is independent of the application module security processing described above. The descrambling apparatus may be realized with conventional decryption apparatus, and may be utilized to perform decryption of received certificates and other data as required. However in the following description of processing transmitted applications, decryption is performed by other apparatus.

An AVI system may include a number of devices capable of operating with the PC-data portion of an AVI signal. For example in FIG. 8 both of the AUX1 and AUX2 processors may be responsive to the PC-data portion of an AVI signal. The AUX1 processor may be a personal computer, PC, arranged to detect transmitted stock market data and to manipulate same with a transmitted interactive application. AUX2 may be a television system arranged to permit interactive impulse buying in conjunction with transmitted interactive commercials. Note, interactivity may be facilitated with the aid of a telephone modem (not shown) interconnected with FIG. 8 system. In addition the IRD controller 89 may be programmed to process and execute transmitted applications, particularly for system maintenance. The receiver functions related to execution of transmitted interactive applications will be described in the context of the IRD controller 89 operating with the transmitted application. (It should be noted, that interactivity does not necessarily mean that the user interacts with the provider, though this is one aspect of interactivity. Interactivity also includes the concept of a user being able to affect the signal/system at the user's end of the system in accordance with a transmitted application, particularly in the realm of educational programs.)

Figure 9:
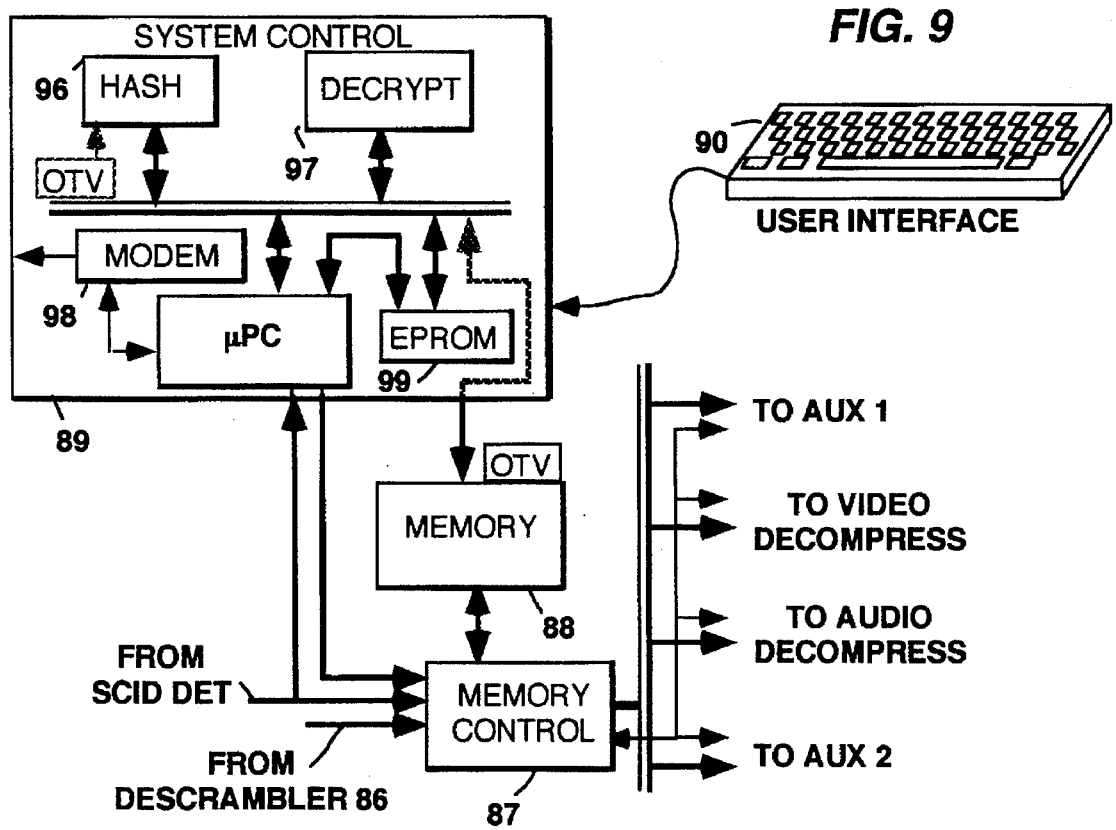
FIG. 9 is an expanded block diagram of an exemplary processor which may be implemented for the processor of the FIG. 8 apparatus.

FIG. 9 shows the IRD controller of FIG. 8 in more detail. The IRD controller 89 is shown with a Hash function processor 96, a decryptor 97, a modem 98 and an EPROM 99. The hash function generator 96 and the decryptor 97 may be realized in either hardware or software. The controller processor (μPC) may include random access memory, RAM, and read only memory ROM, for programming general system instructions. Other system instructions are contained in the EPROM 99. The ROM and the EPROM are programmed at manufacture so that the system is operable. However in this example, the EPROM may be reprogrammed to update system functions via an interactive transmitted program.

Figure 10:
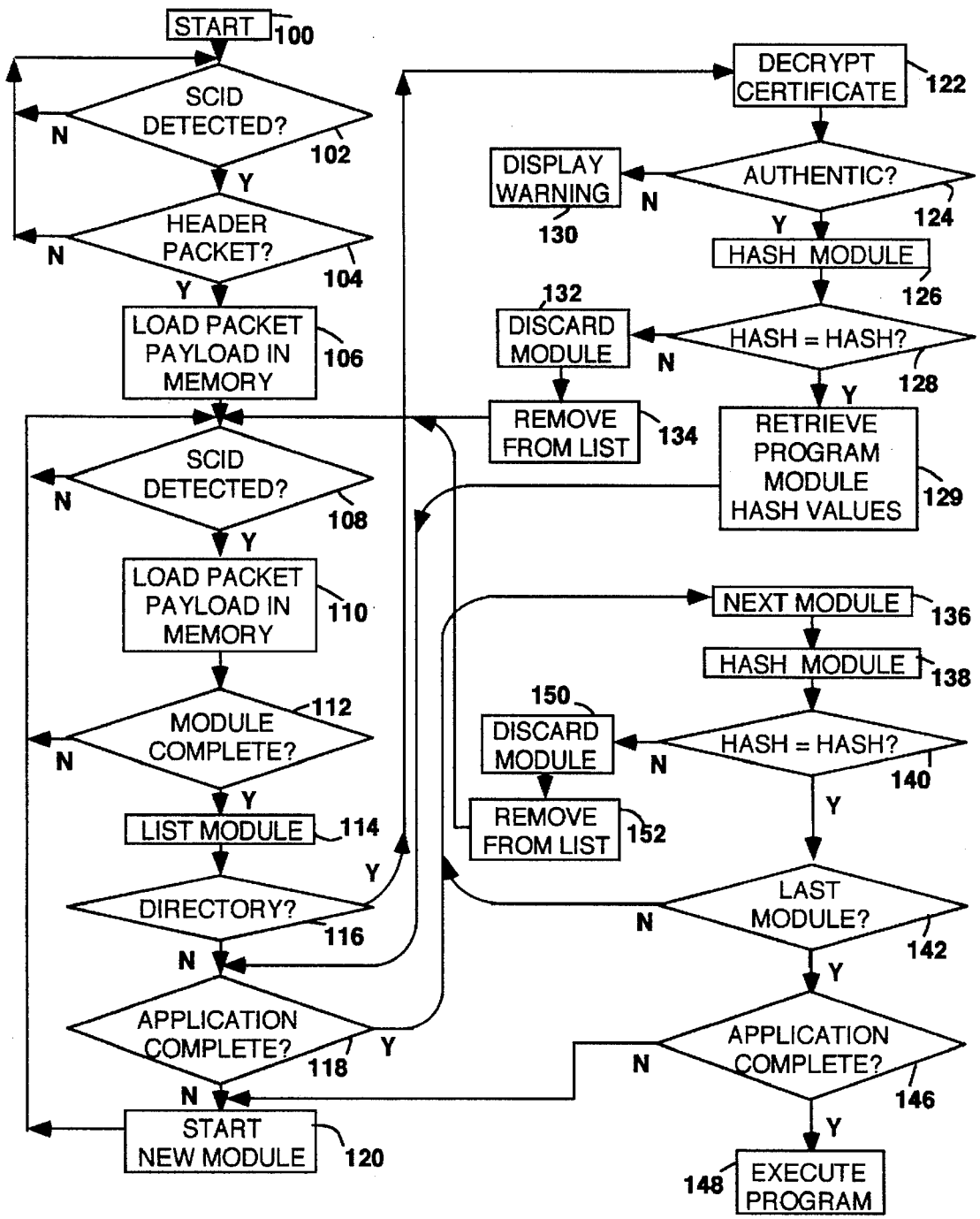
FIG. 10 is a flow chart showing operation of a portion of the receiver apparatus of FIG. 8, and which describes a receiver embodiment of the invention.

Assume that at manufacture, the system is programmed to look for a system maintenance SCID between 1:00 AM and 4:00 AM on mornings that the receiver is not in use, so that the system provider can update respective receivers with new system enhancements. Between 1:00 AM and 4:00 AM on mornings that the receiver is not in use, the μPC will program the SCID detector to look for packets that contain the system maintenance SCID, and prepare the memory 88 to receive program data. An example of program module detection is illustrated in FIG. 10.

The programming for SCID detection and memory preparation is part of the start up processes {100}. Once the SCID detector is programmed the system idles {102} until a packet containing the system maintenance SCID is detected. When such packet is detected, the packet is tested {104} to determine if it contains a transmission unit or module header. If it does not, the packet is discarded and the system waits {102} for the next application packet. It is assumed that the information necessary to load any application program is self contained in the program (TU headers or Directory Module header), hence the system is constrained not to load any detected packets until a packet with the appropriate header information is available. When an appropriate packet is detected, its payload is loaded {106} in the memory 88. The system waits {108} for the next system maintenance packet, and when it is detected it is loaded {110} in the memory 88. A test {112} is made after each packet is loaded in memory to determine if a complete module has been loaded. If the module is not complete, the system jumps back to step {108} to await the next packet. If the module is complete such is noted in a listing {114}.

Figure 11:
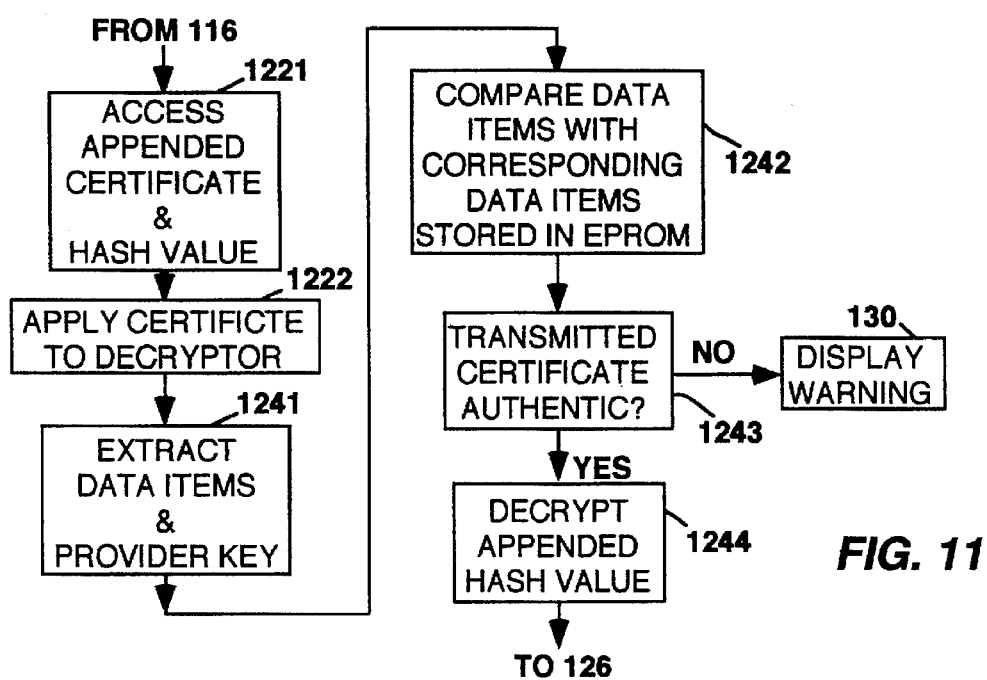
FIG. 11 is a flow chart of an exemplary process for authenticating a certificate and is an embodiment of the invention

A further test is made {116} to determine if the completed module is a Directory Module. If it is, the system will immediately attempt to authenticate the application provider. The certificate appended to the Directory Module is decrypted {122} and its contents are checked {124}. If the contents of the certificate are not authentic, a warning display is activated to inform the user that an unauthorized provider was detected. At this point a number of alternatives are possible, including a) restarting the process at step {100}; b) shutting down the process for twenty four hours; c) discarding the Directory Module and waiting for the next Directory Module; etc. FIG. 11 shows the authentication process in more detail. If at test {16} a Directory Module is detected, the certificate and encrypted hash value appended to the module are accessed {1221}. The certificate is applied to the decryptor 97 and decrypted {1222} using the AVI system controller's public key which has been previously distributed to respective receivers and stored in the receiver. The decrypted certificate is applied to the μPC {1241}. The μPC accesses corresponding items from the EPROM, and compares {1242} relevant corresponding items. For example the certificate will include an ID which is compared against a list of authorized ID's. In addition the certificate may include an expiration time and date which is compared against the current time and date etc. If the compared items check {1243} against corresponding items stored in the receiver, the application provider's public key, which was transmitted in the certificate, is applied to the decryptor and used to decrypt {1244} the encrypted hash value appended to the Directory Module, or to decrypt any other encrypted data provided by the application provider. (At this juncture, if the entire Directory Module is encrypted, it may be accessed from memory and decrypted while the application provider's public key is applied to the decryptor.) On the other hand, if the compared items prove not to be authentic or the certificate has expired, the warning is displayed {130}.

If the application provider is proven to be authentic, the Directory Module is applied to the hash function element 96 and hashed {126}, and the hash value is compared {128} in the μPC with the decrypted Directory Module hash value that was appended to the Directory Module. (In the preferred embodiment an ASCII version of some predetermined text which is associated with the system controller/provider e.g., "OpenTv(™)", will be attached to precede respective modules before hashing so that respective hash values will equal, for example, H(OpenTv(™)+Module). This is indicated in FIG. 9 by the box OTV attached to the memory 88, and is meant to imply that a digital version of the text "OpenTv (™)", for example, may be stored in memory 88, and multiplexed with the Directory Module when it is read from the memory.) If the hash values are not identical, the Directory Module is presumed to include errors and is discarded from memory, and the fact that the module was previously loaded is erased {134} from the listing {114}, and the system returns to the step {108} to wait for the next packet.

If the hash value of the Directory Module agrees with the appended hash value, the hash values for respective program modules are retrieved {129} from the directory for use in checking the integrity of received program modules. The system jumps to step {118} which tests whether all program modules have been loaded in memory. If they have not, memory addressing for the next module is arranged {120} and the system returns {108} to await the next appropriate packet.

If the test at {118} indicates that the application program is completely stored in memory, the respective program modules are checked for transmission integrity. Respective modules are accessed {136} from memory, applied to the hash function element 96, and hashed {138}. The respective hash values are compared {140} in the μPC with the corresponding hash values transmitted in the Directory Module, or appended to the particular module under test. If the hash values do not agree, the module is presumed to contain errors and is discarded {150, 152}, else a test is made {142} to determine if all modules have been checked. If they have all been tested, a check is made {146} to determine if a complete security checked application is resident in memory. If not, the system is returned to step {120} to start loading a new module. If the application is complete, it is executed {148}. In this example the program will instruct the μPC to access particular data in a program Data Module and reprogram the EPROM with the transmitted data.

Once execution has begun, the system is programmed to continue to extract program packets from the transmitted signal. On reception, respective headers are examined for version number. If the version number for a particular module changes, this module will be hash processed, and if the hash value checks, the module with the new version number will be substituted for the prior corresponding module.

As indicated, different apparatus in the receiving apparatus may utilize a particular transmitted application, and may be programmed to perform the requisite security processing prior to execution of the application. In the preferred embodiment, to avoid duplication of programming or hardware, the security processing is performed by the IRD controller. The IRD controller will be alerted when security processing need be performed by information contained in the program guide.

What is claimed is:

1. Apparatus for receiving an executable application transmitted in modules including a Directory Module containing information about further modules, said Directory Module having at least an encrypted hash value over the Directory Module and an encrypted certificate appended, which certificate includes an identity of the application provider, said apparatus comprising:

a memory a detector for detecting said transmitted modules and storing detected modules in memory;

means for separating said certificate from a detected Directory Module;

a decryptor for decrypting said certificate and said encrypted hash value;

a hash function element for hashing said detected Directory Modules to produce a further hash value;

a processor programmed for authenticating decrypted said certificate, and comparing decrypted said hash value with said further hash value, and if decrypted said hash value and said further hash value are equal and said certificate is authentic, permitting execution of said program.

2. The apparatus set forth in claim 1 wherein said Directory Module further includes hash values of further program modules, and said apparatus further includes:

means for accessing said hash values of further program modules from said detected Directory Module;

means for applying respective said further program modules to said hash function element for generating hash values over said further program modules; and wherein said processor is conditioned to compare said hash values of further program modules accessed from said Directory Module with corresponding hash values produced by said hash function element, and permitting execution of said program if at least predetermined ones of corresponding hash values are equal.

3. The apparatus set forth in claim 1 wherein said transmitted Directory Module is encrypted, and said decryptor is conditioned to decrypt said Directory Module with said application provider's public key.

4. The apparatus set forth in claim 2 wherein said processor includes means to delete from said memory, modules for which corresponding hash values are not identical.

5. The apparatus set forth in claim 1 wherein said decryptor and said hash function element are subsumed in said processor.

6. The apparatus set forth in claim 1 wherein said detector includes forward error correcting circuitry.

7. The apparatus set forth in claim 1 wherein said transmitted executable application is transmitted in transport packets, each of which includes a service channel identifier, SCID, and scrambling flags, and said detector includes:

a programmable SCID detector for selecting transport packets having predetermined SCID's from a multiplexed stream of transport packets; and said apparatus further includes a descrambler responsive to said scrambling flags, for descrambling respective packets according to respective states of said scrambling flags.

8. The apparatus set forth in claim 1 further including means for causing a display to indicate detection of signal provided by an unauthorized application provider.

9. The apparatus set forth in claim 1 further including:

a source of a digital version of predetermined text;

apparatus for preceding at least one of said modules, including the Directory Module, with said digital version of predetermined text, and wherein said hash function element is conditioned to hash at least one of said modules preceded with said digital version of predetermined text.

10. The apparatus set forth in claim 9 wherein said predetermined text is OPENTV(™).

11. The apparatus set forth in claim 1 wherein said Directory Module includes a signature S calculated using a RSA algorithm with modulus N and exponent e, and includes quotients Q1, Q2 derived from the signature S by division by the modulus N, and said processor is conditioned to verify said signature S using the quotients Q1 and Q2 without performing arithmetic division.

12. A method of processing executable applications which are transmitted as modules, in multiplexed packet format, said modules including a Directory Module containing information linking respective further application modules, said Directory Module having an encrypted certificate attached which contains information about the provider of the application, and which certificate is encrypted by a system provider's private key, said method comprising;

detecting and selecting packets including a desired application, and storing payloads of respective packets as respective modules;

selecting a Directory Module with encrypted certificate attached;

decrypting the certificate with the system provider's public key;

Comparing information in decrypted said certificate with corresponding stored data;

hashing ones of said application modules to produce module hash values;

comparing said module hash values with corresponding module hash values transmitted in said Directory Module; and executing an application if corresponding produced and transmitted hash values are identical and decrypted information contained in said certificate is equivalent to said corresponding stored data.

13. The method set forth in claim 12 wherein said certificate includes an application providers public key and said Directory Module has a hash value of said Directory Module attached, which hash value is encrypted with said application provider's private key, and said method further includes the steps of:
    extracting said application provider's public key from decrypted said certificate and separating encrypted said hash value from said Directory Module;
    decrypting encrypted said hash value using said application provider's public key; and
    comparing decrypted said encrypted hash value with a hash value of detected said Directory Module.

14. The method set forth in claim 12 further including appending a digital form of the text OpenTv(™) to said Directory Module prior to hashing said Directory Module, and hashing said Directory Module with said digital form of the text OpenTv(™) appended.

15. Apparatus for transmitting executable applications comprising;
    a processor for generating an executable application, and forming said application into modules containing portions of said application and a Directory Module containing information linking modules in an application;
    a hash function element for performing one-way hash functions on modules of said application to produce corresponding hash values, and cooperating with said processor for inserting said hash values in said Directory Module;
    a source of an application provider's public key and a certificate signed with a private key of a system controller and including, an application provider's identifier, and a time stamp related to one of the time of generation and the time of expiration of the certificate;
    means for attaching said application provider's public key and said certificate to said Directory Module; and
    a transport processor for forming a time division multiplexed signal with said modules of said application.

16. The apparatus set forth in claim 15 further including:
    encryption apparatus for encrypting a hash value of said Directory Module containing hash values of said application modules, with a private key of said application provider; and
    means for attaching encrypted said hash value of said Directory Module to said Directory Module.

17. The apparatus set forth in claim 15 wherein ones of said modules are Data Modules in which data is expected to change during execution of said application, and said processor applies version numbers to respective modules, and changes the version number of a module when such module changes;
    said hash function element hashes each changed version of a module to produce a new hash value and cooperates with said processor to attach said new hash value to the module to which it corresponds.

18. The apparatus set forth in claim 15 further including:
    a source of a digital version of predetermined text;
    a multiplexer for multiplexing said digital version of predetermined text with said Directory Module, wherein said hash function element is conditioned to hash the combination of said digital version of predetermined text and the Directory Module.

19. A method of transmitting executable applications comprising:
    generating an executable application and segmenting it into modules;
    forming a Directory Module including information linking respective application modules;
    hashing respective-modules with a one way hash function to generate hash values for respective modules;
    including hash values for respective modules in said Directory Module;
    accessing a certificate including an application provider's identity which certificate is encrypted with a system controller's private key; and
    attaching the certificate to said Directory Module, and transmitting said application.

20. The method set forth in claim 19 further including:
    hashing the directory Module with hash values included therein, to generate a Directory Module hash value;
    encrypting the Directory Module hash value;
    attaching encrypted said Directory Module hash value to said Directory Module.

21. The method set forth in claim 19 further including:
    generating a further certificate including identification of a third party provider;
    encrypting the further certificate with the application provider's private key; and
    attaching encrypted said further certificate to said Directory Module.

22. The method set forth in claim 20 further including:
    encrypting said Directory Module with an application provider's private key, and transmitting said encrypted Directory Module; and
    transmitting remaining application modules in plain text.

23. The method set forth in claim 19 wherein the step of including hash values in said Directory Module includes respective hash values of 128 bit length; and
    the step of attaching the certificate to said Directory Module includes attaching a Certificate including:
    a 32 bit certificate descriptor or flags,
    a 32 bit ID,
    a 32 bit lifetime expiration descriptor,
    a 32 bit file storage limit,
    a 128 bit name, and
    a 32 bit public key.

* * * * *